350-408 SR 4045T WP
OR 2,753,763 X 4021Y X 4035Y
July 10, 1956 J. H. HAINES 2,753,763 T2574
ELECTRON OPTICAL FILTER
Filed Dec. 31, 1952 X 2574
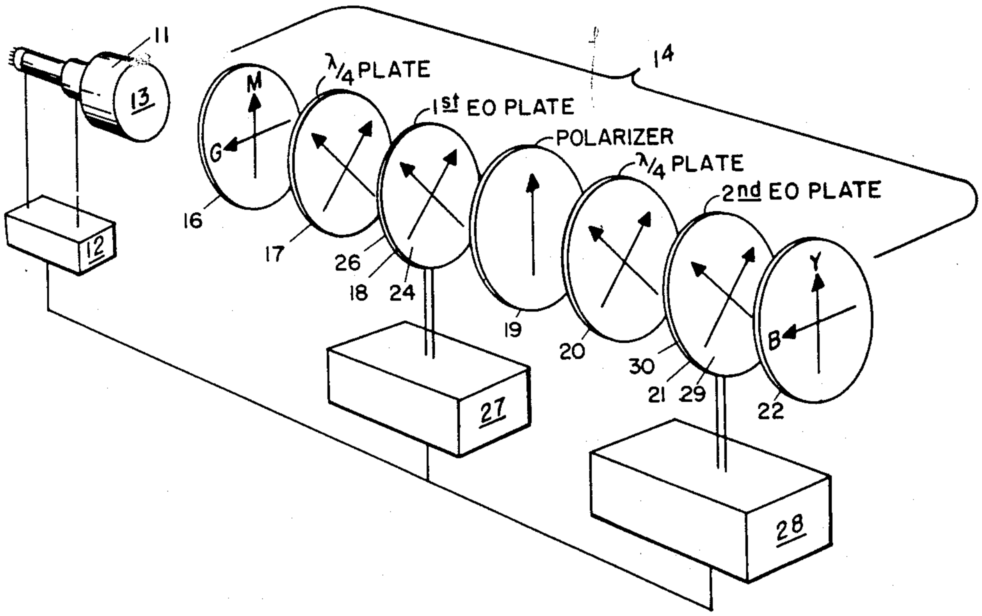
INVENTOR.
JESSE H. HAINES
BY Darby + Darby
ATTORNEYS 2,753,763
Patented July 10, 1956

2,753,763

ELECTRON OPTICAL FILTER

Jesse H. Haines, Philadelphia, Pa., assignor to Allen B. Du Mont Laboratories, Inc., Clifton, N. J., a corporation of Delaware Application December 31, 1952, Serial No. 329,036
3 Claims. (Cl. 88—61)

This invention relates to color television reproduction devices and to an electronic color filter to be used therewith.

Electro-optical filters of the prior art for use with color television systems must be removed from their position in front of the cathode ray tube if the switching circuits for the color filter become inoperative and it is desired to continue reception of the color television signal on a black-and-white basis.

A primary object of the invention is to provide an improved electronic color filter.

Other objects are to provide an electronic filter which need not be removed from its position in front of the cathode ray picture tube to observe black-and-white television images; and to provide an electronic filter which will serve as a neutral density filter when the operating voltages are removed therefrom so that the black-and-white picture seen through an inoperative filter will have about the same reduction in brightness as a color picture seen through an operative filter, thereby making it unnecessary to adjust the brightness control when switching between black-and-white and color.

Further objects will be apparent after studying the following specification and drawing in which the only figure is an exploded view, in perspective, of a television viewing device including one embodiment of the filter forming the invention.

In the drawing, a cathode ray tube 11 is energized by a source 12 of operating potentials in the usual way to produce a pattern of light, or raster, on the fluorescent screen 13 thereof. An electronic filter 14 constructed according to the invention is mounted in front of the screen 13 to filter light therefrom in order to produce a color television picture. Filter 14 comprises, in order, a first dichroic polarizer 16, a quarterwave retardation plate 17, a first electro-optical device 18, a linear polarizing plate 19, a second quarterwave plate 20, a second electro-optical device 21 and a second dichroic polarizer 22. The front and back surfaces of the first electro-optical device, or plate 18, are coated with transparent electrodes 24 and 26 to which the terminals of a power supply 27 are connected, and a similar power supply 28 is connected to electrodes 29 and 30 on the front and back surfaces, respectively, of the second electro-optical plate 21. The power supplies 27 and 28 are connected to the source 12 to be synchronized therewith.

Fluorescent screen 13 emits randomly polarized polychromatic light comprising the red, blue, and green primary color components of white light. The term "polychromatic" is used to indicate that the proportions of the three primary color components is not necessarily such as to appear white; it may be distinctly shaded by an excessive amount of one component. According to standard vector notation this randomly polarized light may be represented by two mutually perpendicular vectors, each composed of the three primary color components, and it may be assumed without loss of generality that the coordinate system is chosen to make one of the vectors horizontal and the other vertical.

The characteristic property of linear polarizers, such as polarizer 19, is the transmission of all three of the color components of one of the vectors and the complete absorption of all three color components of the other vector.

Dichroic polarizers, on the other hand, are characterized by the transmission of one, two or all three color components of one of the vectors and transmission of at least one component of the other vector. It is essential, for satisfactory operation of filter 14 in a three color television system, that each of the dichroic polarizers 16 and 22 transmit at least two primary color components of one of the vectors and the third primary component of the other vector. Such dichroic polarizers are designated 2—1 polarizers. It is also essential that dichroic polarizers 16 and 22 not have the same transmission characteristics; if, for instance, dichroic polarizer 16 transmits the red and blue component of one vector in one plane of polarization, and the green component of the other vector in the other plane of polarization (normal to the first), dichroic polarizer 22 may transmit the red and green in one plane of polarization and the blue in the other (perpendicular) plane of polarization; or alternatively polarizer 22 may transmit blue and green components in one plane of polarization and red in the other.

Other types of dichroic polarizers include the 2—2 polarizer which transmits two primary components in one plane of polarization and two in the other plane. Since there are only three primary components, one must be transmitted in both planes for a 2—2 polarizer. There are also 3—1 and 3—2 dichroic polarizers, which are designated according to the nomenclature set forth above.

For the present, it will be assumed that the 2—1 type of dichroic polarizer is used for both polarizers 16 and 22. Dichroic polarizer 16 passes the red and blue primary components in the same plane of polarization (vertical) and the green in the other plane and so is called a magenta-green polarizer.

The effect of the quarterwave plate 17 is to transform the linearly polarized primary color component vectors transmitted by dichroic polarizer 16 into circularly polarized vectors while substantially maintaining the perpendicularity between the vector representing green and that representing blue and red.

Electro-optic devices are P-type crystals of materials, such as ammonium dihydrogen phosphate, which have the property of rotating the polarization of light passed therethrough by an amount depending on the voltage applied across the plates. In particular, the electro-optic device, or plate, 18, is energized by the voltage generated in source 27 acting through the medium of the transparent electrodes 24 and 26. When the output voltage of source 27 is zero, light passes through plate 18 without change of polarization, whether circular or linear, but when the potential of electrode 24 is raised to about 4500 volts positive with respect to the potential of electrode 26, plate 18 assumes the characteristics of a quarterwave plate which acts on the circularly polarized light passing therethrough in such a way as to stop its rotation and change it to linearly polarized light. The planes of polarization of the green and the magenta components of the linearly polarized light emerging from plate 18 will either have the same orientation as they had when emerging from the dichroic polarizer 16 or will be rotated 90°, depending on whether plate 18, when energized with the aforementioned electrical polarity, acts like a quarterwave retardation plate or a quarterwave advancement plate. In order to fix ideas concerning the operation, it will be assumed that plate 18 behaves like a quarterwave retardation plate when electrically polarized as described. On the other hand, when the potential of electrode 26 is made about 4500 volts positive with respect to that on electrode 24, the opposite effect takes place: plate 18 acts like a quarterwave advancement plate and the polarity of the emergent magenta and green components returns to the same orientation they had when emerging from dichroic polarizer 16.

The linear polarizer 19 passes light in one polarity only (vertical in the present example) so it will pass either the red and blue components, if electrode 26 is positive, or the green component, if electrode 24 is positive.

However, if no voltage is applied to plate 18 by source 27, as is the case when source 27 is accidentally or deliberately rendered inoperative, light will pass through plate 18 without change, i. e., the circularly polarized light from quarterwave plate 17 will impinge on linear polarizer 19 with the same circular polarization. This circularly polarized light can be split into two substantially equal vector components, one horizontal and one vertical, each of which will comprise all three primary color components, just as the original light from screen 13. Linear polarizer 19 is oriented so as to pass only the vertically polarized vector components so that the intensity of the light emerging therefrom is cut in half and the total intensity of light impinging on quarterwave plate 20 is therefore one-fourth of the original intensity of screen 13. This reduced intensity light, however, still has all three color components.

Quarterwave plate 20 circularly polarizes the vertically polarized light emerging from polarizing plate 19, just as the quarterwave plate 17 did with the light from dichroic polarizer 16. As a result, the vector representing the light emerging therefrom and impinging on electro-optic plate 21 is rotating with respect to the coordinate axis. Depending on whether the source 28 is energized or not, the electro-optic plate 21 will either stop the rotation of the circularly polarized light or will pass it unaltered to the second dichroic polarizer 22.

If the electrodes 29 and 30 of the plate 21 are energized by source 28 so as to make the plane of polarization of the emerging light horizontal, only the blue component can pass through the second dichroic polarizer 22. If the sign of the electricial potential applied to electrodes 29 and 30 be reversed, the plane of polarization of the light emerging from plate 21 will be vertical, and the yellow, or red-plus-green, component can pass through plate 22 to the exclusion of the blue component. In normal operation, either the red or the green component would already have been removed from the light beam by dichroic polarizer 16 so that only one of these two components would be left to pass through the second dichroic polarizer 22.

Again, if sources 27 and 28 are both inoperative, the plane polarized white light, emerging from the linear polarizer 19 will be circularly polarized by quarterwave plate 20 will pass unaffected through electro-optic plate 21, and will impinge on dichroic polarizer 22. The vector representing the total circularly polarized light will then be separated into substantially equal horizontal and vertical vector components by dichroic polarizer 22. Of these components, the horizontal blue and the vertical red and green can pass through dichroic polarizer 22 and be observed by the operator of the device. Since the human eye is not sensitive to the polarization of light impinging thereon, the observer will see a black-and-white image. However, the intensity of the emerging white light could be no greater than ⅛ the intensity of light emitted by screen 13, since it is again reduced by a factor of one-half in passing through the second dichroic polarizer 22.

If sources 27 and 28 are energized sequentially to cause the filter 14 to take on the characteristics of a red, blue and green color filter for equal intervals of time, the intensity of light emerging from the filter is one-sixth of the intensity of light from screen 13 due to a reduction of one-half in polarizer 16 multiplied by a further reduction of one-third due to the fact that each primary component is transmitted only one-third of the time. The reduction to one-sixth of the original valve for a color picture is comparable to the reduction of one-eighth for a black-and-white picture.

It will be apparent to those skilled in the art of electro-optic filters that various modifications may be made in filter 14 which lie within the scope of the invention. One of these modifications which has already been discussed, is the use of different color combinations of the dichroic polarizers 16 and 22, the only limitations being that polarizers 16 and 22 must not be identical and that each must pass at least two color components in one polarization, either horizontal or vertical, and must pass at least the third color component in the other polarization. This does not preclude the use of 2—2 dichroic polarizers, which may pass, for instance, vertically polarized red and blue components and horizontally polarized red and green components. However, since a single 2—2 dichroic passes a chosen one of the component colors in both polarizations, there is no reduction of the intensity of that component, whereas the intensity of the other two components is halved. This has no effect on the color quality of a color picture produced by an energized electronic filter using one 2—2 dichroic but would give a shading of the chosen color to a supposedly "black-and-white" picture seen through an unenergized electronic filter.

There are, however, several ways in which the disadvantages of this shading may be mitigated. One way is to use the shading to overcome an inherent inverse shading of the filter 14 or the fluorescent screen 13. For instance, if the light from screen 13 is weak in the red component, one of the double dichroic polarizers 16 or 22 may be a 2—2 dichroic polarizer transmitting red and blue (magenta) in one polarization and red and green (yellow) in the other polarization.

Another way is to make both dichroic polarizers 16 and 22 of the 2—2 type, one being a magenta-yellow polarizer, for instance, and the other being a cyan-magenta polarizer. For that particular arrangement, both the red and the blue component colors would be enhanced with respect to the green component. Some present day phosphors, such as the P15, for use in screen 13 produce light which contains an excessively large green component, and the picture on screens of such phosphors may be improved significantly by enhancing either the red component or the red and blue components over the green. It is also true that the filtering action of dichroic polarizers is not always perfect, and the overall picture transmitted by practical dichroic polarizers may be improved by enhancement of one or two color components.

Electronic filter 14 may be termed a two-stage filter because there are two sets of dichroic polarizers, quarterwave plates, and electro-optic plates. Two stages are sufficient for 2—1 and 2—2 dichroic polarizers, but for 3—1 or 3—2 dichroic polarizers it is necessary to use three stages if a three-color picture is to be produced. Otherwise the operation of 3—1 and 3—2 dichroic polarizers corresponds to that of the 2—1 and 2—2 types. A certain amount of light is advertently lost in each stage, so that it is preferable to limit the filter to two stages unless other factors make the 3—1 or 3—2 polarizers more desirable.

A further possible modification of filter 14 is that linear polarizer 19 may be interchanged with either of the dichroic polarizers 16 or 22.

Still further modifications will be apparent to those skilled in the art, the scope of the invention being defined by the following claims.

What is claimed is:

1. In combination, an electronic color filter and electrical means connected thereto to cause the filter to transmit each of the three primary color components of light in turn depending upon the nature of the energizing electrical signals from said means and to allow said filter to transmit all color components simultaneously when said electrical signals are reduced to zero, said filter comprising: a first and a second section, said first section including a first and a second polarizer, said first polarizer being a dichroic polarizer which passes at least a first primary color component of light in one plane of polarization and the second and third primary color components of light in a perpendicular plane of polarization and said second polarizer passing all color components of light in one of said planes of polarization, said first section also including, between said first and second polarizers, a quarter wave plate which transforms linearly polarized light into circularly polarized light, and an electro-optic device connected to said electrical means to operate as one type of quarter wave plate and allow said first component of light to pass through both said polarizers when a first energizing electrical signal from said means has one polarity and to operate as a second type of quarter wave plate to allow said second and third components to pass through both said polarizers when said first energizing electrical signal has the reverse polarity and to be optically inactive when said electrical signal is reduced to zero, said second section comprising one of said polarizers together with a third polarizer which is a dichroic polarizer and which transmits at least said second color component of light in one of said planes of polarization and said first and third color components of light in a perpendicular plane of polarization, said second section also including, between said one of said polarizers and said third polarizer, a second quarter wave plate and a second electro-optic device connected to be energized from said electrical means by a second electrical signal to permit said second color component to pass through said second section when said second signal has one polarity and to permit said first and third color components to pass through said second section when said second signal has the reverse polarity.

2. In combination, an electronic color filter and a pair of pulse voltage sources each generating electrical pulses having voltage excursions of opposite polarity about the average voltage value of said pulses, connections between each of said sources and appropriate portions of said filter to cause said filter to become transparent to each of the three primary color components of light in turn depending on the instantaneous polarity of pulses from said sources and to allow said filter to transmit all color components simultaneously when the amplitude of pulses is reduced to zero, said filter comprising: first and second sections through which light passes, each of said sections comprising a pair of polarizers and a quarter wave plate and an electro-optic plate located between said polarizers in each pair of polarizers, one of said polarizers being common to said first and second sections, the pair of polarizers in said first section including a dichroic polarizer which passes one primary color component of light in one plane of polarization and the other two primary color components of light in a perpendicular plane of polarization and a linear polarizer which passes all primary color components of light in one of said planes of polarization, the quarter wave plate of said first section operating to polarize substantially circularly all of the light passing through it and the electro-optic plate of said first section having a pair of electrodes connected to a first one of said pulse voltage sources to change the circularly polarized light back into linearly polarized light to allow said first color component to pass through said first section when the pulses from said first source have one polarity and to transform the circularly polarized light into plane polarized light with a perpendicular polarization when said pulses of said first source have the opposite polarity, said second section comprising a second dichroic polarizer which transmits said second color component of light in one of said planes of polarization and transmits said first and third color components of light in a perpendicular plane of polarization, said quarter wave plate of said second section also operating to transform the light passing through it into substantially circularly polarized light, and said electro-optic plate of said second section having a pair of electrodes connected to the second one of said sources to be energized by the voltage pulses therefrom to allow said second color component of light to pass through said second section when the pulses of said second source have one polarity and to allow the first and third color components to pass through said second section when the pulses of said second source have the opposite polarity.

3. An electronic color filter and energizing pulse voltage sources therefor, said filter comprising, in order, a first dichroic polarizer which transmits one primary color component of light in one plane of polarization and the second and third primary color components of light in a perpendicular plane of polarization, a quarter wave plate to transform the plane of polarized light passing through said dichroic polarizer into circularly polarized light; a first electro-optic plate having electrodes on opposite sides thereof and connections from said electrodes to a first one of said energizing pulse voltage sources to cause said first electro-optic plate to transform the circularly polarized light with one orientation when the pulses from said first source have one polarity and to transform said circularly polarized light into plane polarized light with a perpendicular orientation when the pulses of said first source are of the opposite polarity and to be optically inactive when the amplitude of said pulses is reduced to zero whereby said circularly polarized light is passed through said electro-optic plate without change, a linear polarizer which passes all primary color components of light in one of said planes of polarization, a second quarter wave plate to transform the plane polarized light passing through said linear polarizer into circularly polarized light; a second electro-optic plate having a pair of electrodes and connections from said last-named electrodes to a second one of said pulse voltage sources to energize said electro-optic plate and cause it to transform the circularly polarized light from said second quarter wave plate into plane polarized light with one orientation when the pulses of said second source have one polarity and to transform said circularly polarized light into plane polarized light oriented perpendicularly when the pulses of said second source have the opposite polarity and to be optically inactive so as to pass said circularly polarized light without change when the amplitude of said pulses is reduced to zero, and a second dichroic polarizer which passes said second primary color component in one of said planes of polarization and said first and third primary color components in a perpendicular plane of polarization.

References Cited in the file of this patent

UNITED STATES PATENTS

| | | |
|---|---|---|
| 1,997,371 | Loiseau | Apr. 9, 1935 |
| 2,184,999 | Land | Dec. 26, 1939 |
| 2,350,892 | Hewson | June 6, 1944 |
| 2,493,200 | Land | Jan. 3, 1950 |
| 2,527,593 | Stadler | Oct. 31, 1950 |
| 2,531,951 | Shamos | Nov. 28, 1950 |
| 2,586,635 | Fernsler | Feb. 19, 1952 |
| 2,616,962 | Jaffe | Nov. 4, 1952 |

OTHER REFERENCES

"Electrical Color Filters" (Babits and Hicks), Electronics, vol. 23, No. 11, pp. 112–115, Nov. 1950.